United States Patent [19]

Takahashi et al.

[11] Patent Number: 5,253,320
[45] Date of Patent: Oct. 12, 1993

[54] OPTICAL FIBER CABLE LEAD-IN STRUCTURE

[75] Inventors: Tetsuya Takahashi; Sataroh Sawano; Hiroshi Yamaji; Tomoyuki Hongoh; Hiroshi Kadoya, all of Kawasaki, Japan

[73] Assignee: Fujitsu Limited, Kanagawa, Japan

[21] Appl. No.: 980,178

[22] Filed: Nov. 23, 1992

[30] Foreign Application Priority Data

Nov. 29, 1991 [JP] Japan .................. 3-316155

[51] Int. Cl.⁵ ............................................. G02B 6/36
[52] U.S. Cl. ................................................. 385/135
[58] Field of Search .............. 174/50, 65 R; 361/412, 361/413, 415, 428, 429; 385/134, 135

[56] References Cited

U.S. PATENT DOCUMENTS 4,272,141  6/1981  McKeen et al. ............. 361/415
4,861,134  8/1989  Alameel et al. ............. 385/135

FOREIGN PATENT DOCUMENTS 2-91996    3/1990  Japan .
85/04960  11/1985  PCT Int'l Appl. .
2217520   10/1989  United Kingdom .

Primary Examiner—John D. Lee
Assistant Examiner—John Ngo
Attorney, Agent, or Firm—Armstrong, Westerman, Hattori, McLeland & Naughton

[57] ABSTRACT

An optical fiber cable lead-in structure for a shelf (1) having a space (7) for receiving a remaining portion of the optical fiber cable (23), and an electronic circuit unit (12) mounted thereon having a board (14) and a surface plate (15) provided perpendicularly at one side of the board (14); the surface plate (15) covering the front side of the shelf (1) when mounting, comprising: an optical connection (21;25) for connection between the optical fiber cable (23) and the electronic circuit unit (12), which is provided on the board (14) adjacent to the backside of the surface plate (15); an outwardly protruding portion (33) that is provided in the surface plate (15) so as to correspond to the optical connection (21;25), such that an attaching and detaching operation of the optical connection (21;25) may be easily effected; and an opening (27) that is provided in the surface plate (15) such that the optical fiber cable (23) extending from the remaining fiber cable receiving space (7) is wired so as to extend along the surface plate (15) until it passes through the opening (27) of the surface plate (15) while describing a slight arch, and in turn to extend along the backside of the surface plate (15) while describing another slight arch until it reaches the optical connection (21;25) on the board (14) of the electronic circuit unit (12).

4 Claims, 6 Drawing Sheets

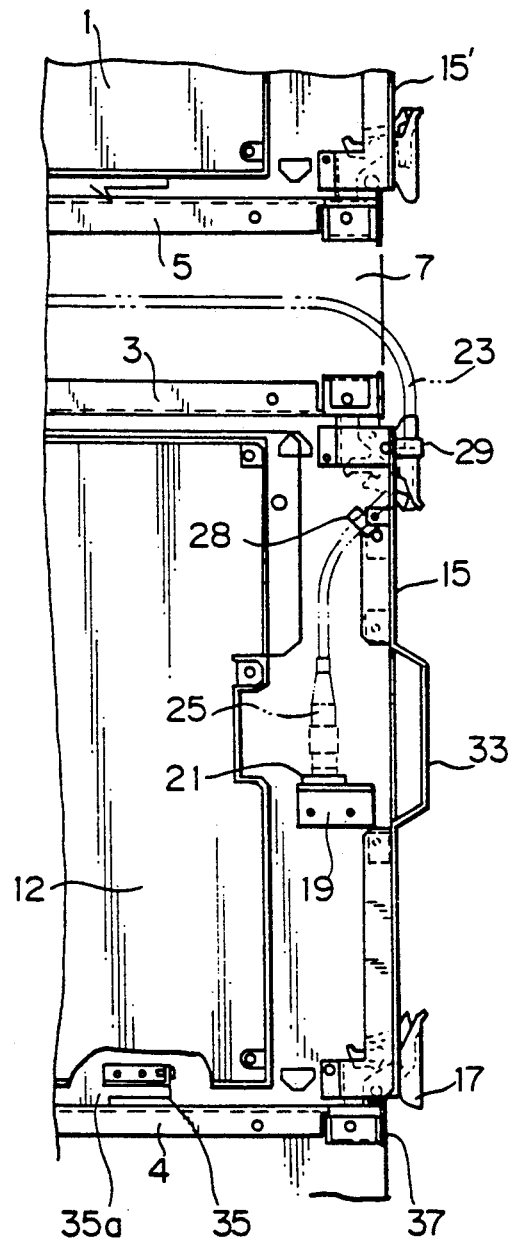
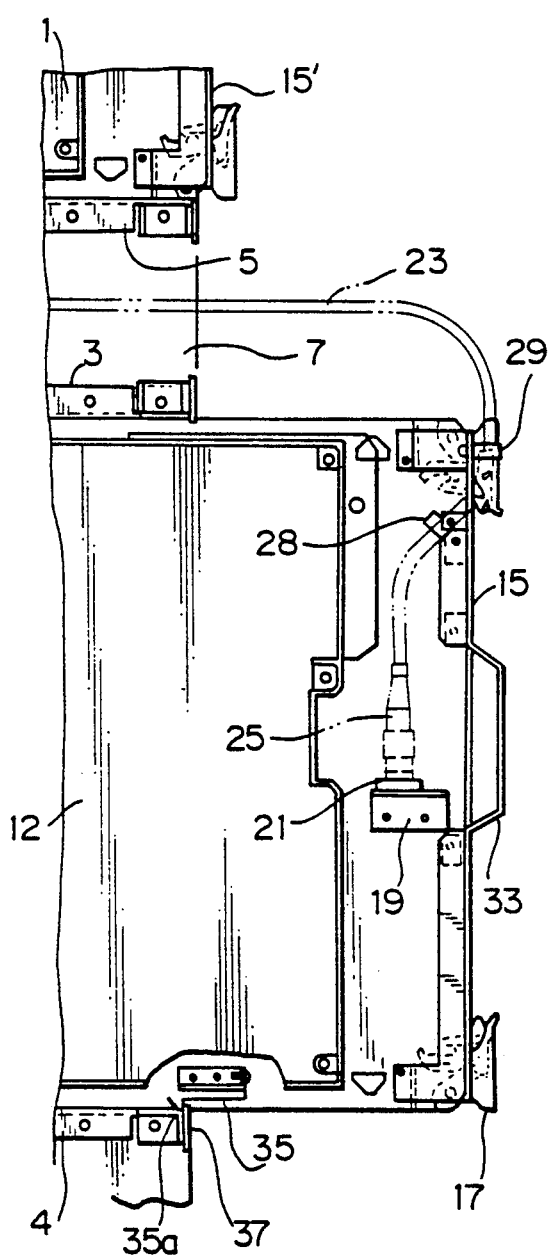

OPTICAL FIBER CABLE LEAD-IN STRUCTURE

BACKGROUND OF THE INVENTION

1. Field of the Invention

The present invention relates to an optical fiber cable lead-in structure.

2. Description of the Related Art

In communication equipment such as optical communication equipment, an electronic circuit unit (hereinafter referred to as "unit") mounted on a shelf is usually connected electrically and optically to other units and an external apparatus through a back wiring board situated at the back surface of the shelf. However, these units are now highly densified and connection of the units to the back surface of the shelf only is no longer adequate and it is imperative to use the front space of the shelf as well.

Referring to FIG. 6, which discloses an example of such a shelf, the front surface of the shelf 61 is almost covered by the surface plates 63 of many units 62 that are mounted in parallel formation inside the shelf. An optical fiber cable 67 has at its end an optical connecter 69 that is detachably connected to a corresponding optical adapter 65 of each surface plate 63. Each of the optical fiber cables 67 is attached perpendicularly to the surface plate 63 and the cable portion thereof is extended to describe a large arch for connection to other units and the external apparatus and is led and received in a remaining cable receiving space 71 provided between the upper and lower surface plates 63.

In the above optical fiber cable lead-in structure, a problem has been that the cable portion is forced out of the front side of the shelf and it is difficult to protect the optical fiber cable 67, which is subject to damage by bending. It has also been found that a large space is needed to install such a shelf (equipment) 61 with outwardly extending fiber cables.

SUMMARY OF THE INVENTION

The primary object of the present invention is, therefore, to provide an optical fiber cable lead-in structure in which safety of the optical fiber cable, simplification of wiring, and both attachment and detachment of the fiber cable can be realized and at the same time, the appearance of the equipment can also be improved by minimizing the protrusion of the cable in front of the surface plate.

To achieve the above object, according to the present invention, there is provided an optical fiber cable lead-in structure for a shelf (1) having a space for receiving a remaining portion of the optical fiber cable, and an electronic circuit unit mounted thereon having a board and a surface plate provided perpendicularly at one side of the board, the surface plate covering the front side of the shelf when mounting, comprising: an optical connection for connection between the optical fiber cable and the electronic circuit unit, which is provided on the board adjacent to the backside of the surface plate; an outwardly protruding portion that is provided in the surface plate so as to correspond to the optical connection, such that an attaching and detaching operation of the optical connection may be easily effected; and an opening that is provided in the surface plate such that the optical fiber cable extending from the remaining fiber cable receiving space is wired to extend along the surface plate until it passes through the opening of the surface plate while describing a slight arch, and in turn to extend along the backside of the surface plate while describing another slight arch until it reaches the optical connection on the board of the electronic circuit unit.

With this arrangement, as the fiber cable is readily led into the unit through the surface plate so as not to protrude outwardly and it is optically connected at the position adjacent to the backside of the surface plate, the parts mounting space in the unit is fully available and the optical fiber cable is kept in good condition and both the attachment and detachment operation of the optical connecting portions can be simplified because the portion of the surface plate facing the optical connecting portions is forced out.

BRIEF DESCRIPTION OF THE DRAWINGS

These and other objects and features of the present invention will become apparent from the following detailed description of the preferred embodiment, in connection with the attached drawings.

In the drawings:

FIGS. 5(A) and 5(B) are views illustration the mounting condition of the electronic circuit unit on the shelf, FIG. 5(A) is a view illustrating the unit set in position, and FIG. 5(B) is a view illustrating the unit pulled out to a certain extent; and, FIG. 6 is a perspective view illustrating the conventional shelf.

DETAILED DESCRIPTION OF THE INVENTION

Figure 1:
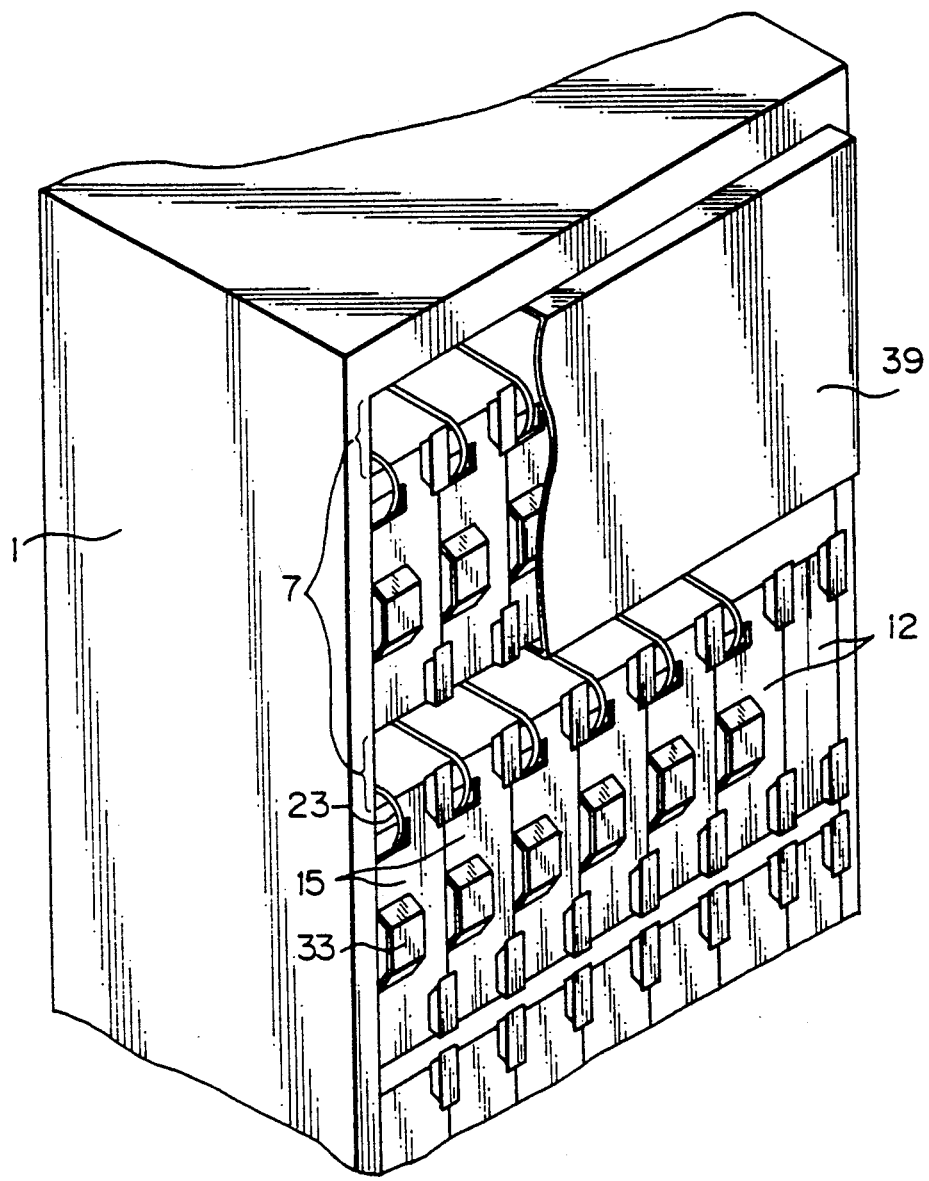
FIG. 1 is a perspective view illustrating an embodiment of the optical fiber cable lead-in structure of the present invention.
Figure 2:
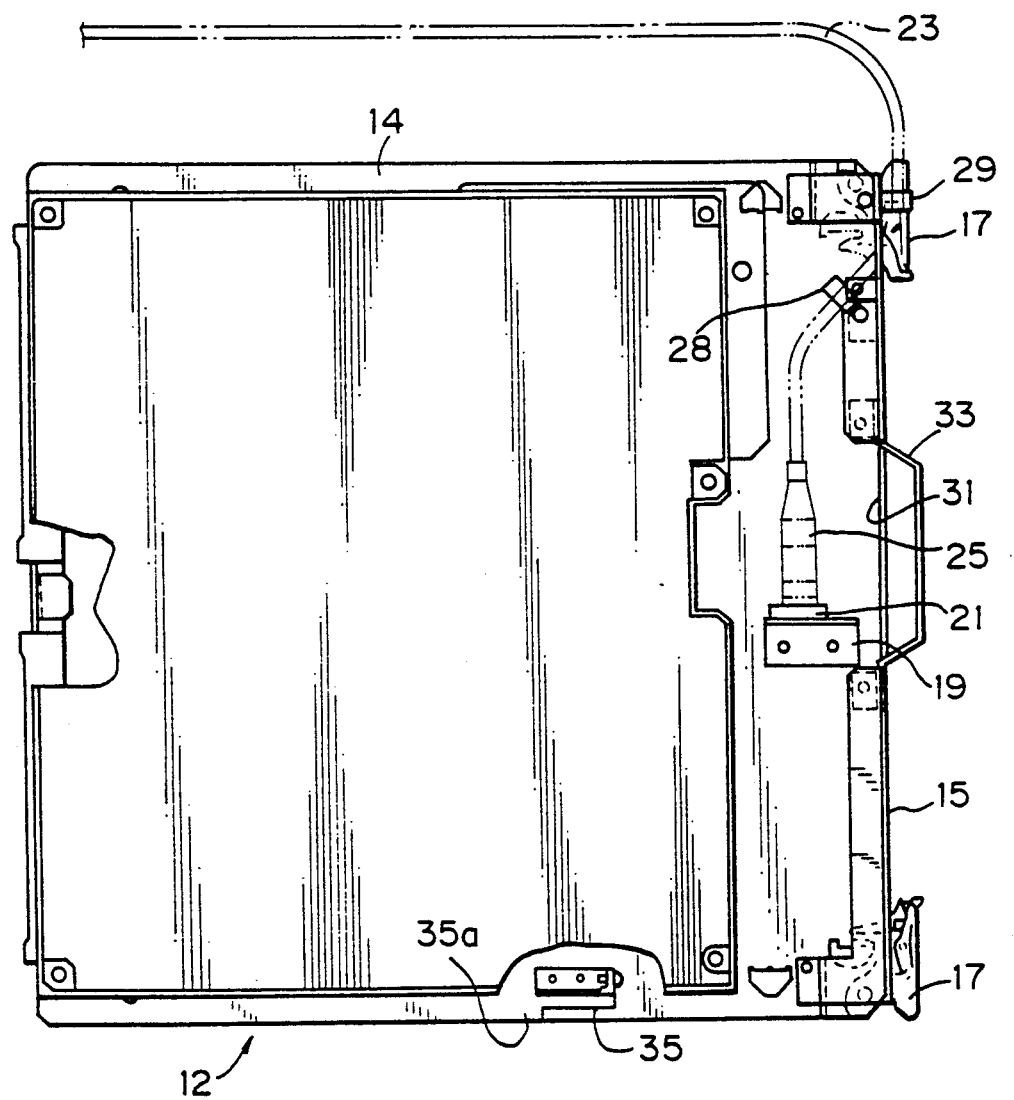
FIG. 2 is a plan view illustrating the electronic circuit unit of the present invention.
Figure 3:
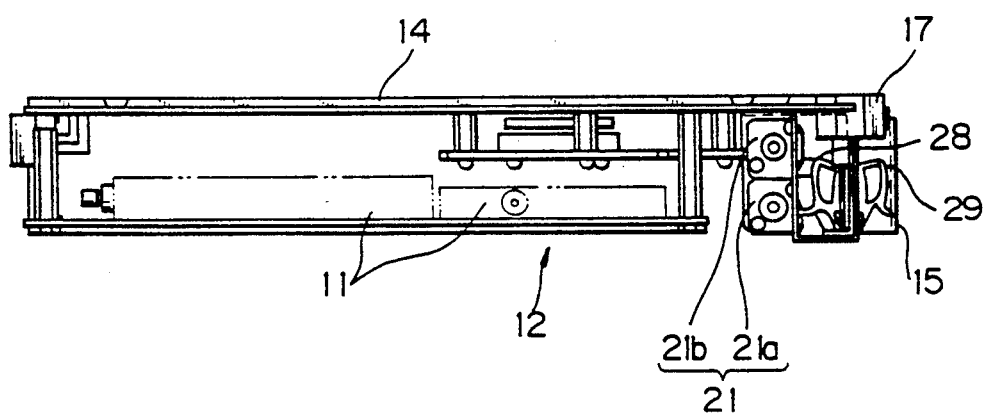
FIG. 3 is a top side elevation view illustrating the electronic circuit unit.
Figure 4:
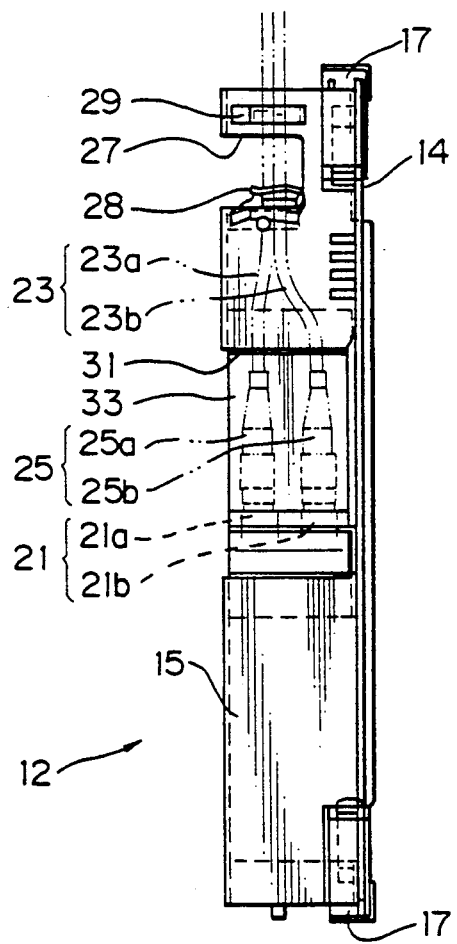
FIG. 4 is a right side elevation view of the electronic circuit unit.
Figure 6:
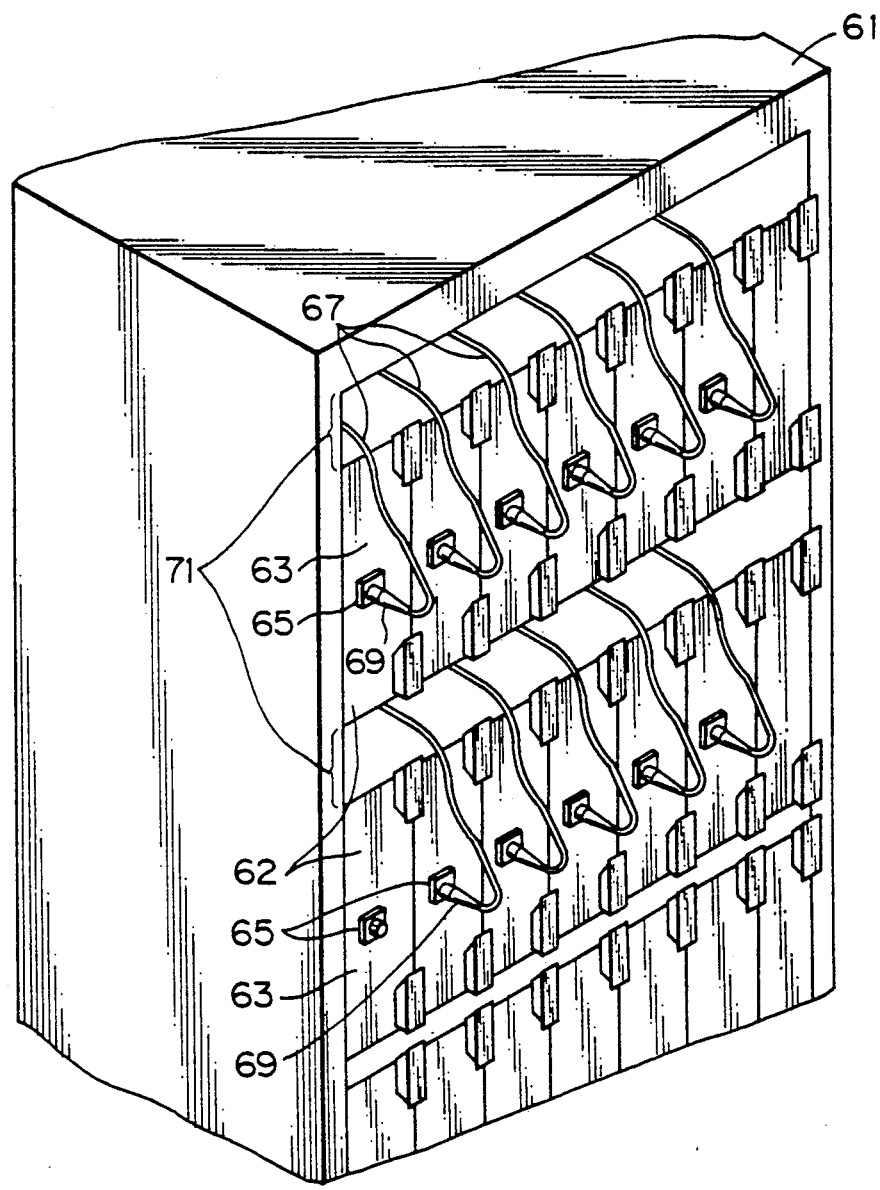

A detailed description of the drawings will be made. FIG. 1 is a general view illustrating the optical fiber cable lead-in structure of the present invention. FIGS. 2 to 4 are views illustrating the electronic circuit unit in which the optical fiber cable is properly extended. FIG. 5 is a view illustrating the relation between the shelf and the unit.

Referring now to FIGS. 2–4, an electronic circuit unit (hereinafter referred to as "unit") 12 mounts optical modules 11 thereon, and a printed circuit board 14 is designed to form a base (base surface) for the unit 12. A surface plate 15 is situated at the rear side (at the right side in FIG. 2) of the printed circuit board 14 and secured perpendicularly to the board 14 to partially cover the front surface of the shelf 1 (see FIG. 1). Ejectors 17 are pivotally mounted on the top and lower ends of the surface plate 15 and at the position adjacent to the print circuit board 14 to secure the unit 12 to or remove it from the shelf 1.

Two optical adapters 21 (21a, 21b) are mounted at the prescribed position of the printed circuit board 14 and adjacent to the backside of the surface plate 15 by means of a L-shaped mounting plate 19 so that they can be situated side by side in the direction of the board's thickness. Two optical connecters 25 (25a, 25b), provided at the ends of the optical fiber cables 23 (23a, 23b), are detachably connected to the corresponding optical adapters 21 (21a, 21b) so as to extend vertically.

The optical fiber cables 23 do not immediately protrude through the surface plate 15, but extend upwardly to some degree and then protrude through a cut-out portion 27 formed at the upper side of the surface plate 15 after describing a small arch. The cable portion is detachably and loosely secured to the surface plate 15 by a clamp (or a fastener) 28 of resinoid, which is mounted at an angle to the plate 15 before it protrudes.

The cable portion comes out of the cut-out 27 portion of the surface plate 15 and extends upwardly along the narrow space formed right above the cut-out portion 27 and is then led in the forward direction (in the unit insertion direction) of the printed circuit board 14 so as to be parallel to the edge portion of the board. The cable portion extending along the narrow space of the surface plate above the cut-out portion 27 is secured to the surface plate 15 in the same manner as stated above by another resinoid clamp 29.

As stated above, both the optical adapters 21 and the optical connecters 25 are arranged parallel with the surface plate 15 and are adjacent to the backside of the surface plate 15 as close as possible so that the parts mounting space within the unit 12 can be fully used. Under these circumstances, it will be difficult for an operator to insert his hand into the unit to hold the optical connecter 25 and detach it from the optical adapter 21.

In this embodiment, the surface plate portion facing the optical adapters 21 and the optical connecters 25 is cut out rectangularly to secure the operation space, and a trapezoidal cover 33 is secured, at both its flange portions, to the backside of the surface plate 15 to cover the cut-out portion 31, making its center part protrude outwardly.

Referring now to FIG. 5 (A), the unit 12 having such a structure as stated above is guided so as to be set in position by the upper and lower frame 3, 4 within the shelf 1. The remaining portion of the optical fiber cable 23 extends upwardly from the upper part of the surface plate 15 of the unit 12 to be received in the remaining cable receiving space 7 formed between the upper and lower surface plates 15, 15' (that is, formed between the upper side frame 3 and another frame 5 above).

Referring now to FIG. 5 (B), the unit 12 is pulled out to a certain extent to attach or detach the optical connecters 25. The unit 12 is, at its lower center portion, provided with a stopper member 35 that has a protrusion 35a and is made of a resilient member such as phosphor bronze. The unit 12 is therefore designed not to come out of the shelf 1 during the pulling out operation because the protrusion 35a of the stopper member 35 engages with the plate member 37 provided at the end of the lower frame 4 of the shelf 1. The unit 12 can be thus kept in a safe and certain manner and even in the half pull-out mechanical position, and it is superior in operational efficiency.

As explained above, the optical fiber cable in this embodiment is designed so as not to protrude from the surface plate to a great extent and can be extended within the unit without receiving excessive force thereon, and the optical connecter is readily attachable or detachable by maximizing the parts mounting space within the unit. According to this invention, there is provided an improved operation in both the attachment and detachment of the optical connecters. The appearance of the equipment is also improved because of the highly densified compact structure.

Furthermore, as shown in FIG. 1, an integrated cover 39 can also be mounted on the shelf to cover all of the units placed in a horizontal row to ensure an effective electromagnetic shield of the front side of the shelf.

In the optical fiber cable lead-in structure, according to the present invention, and the fiber cable is designed to be smoothly led into the unit through the surface plate and the optical connector is detachably mounted within the unit while minimizing the effect on the mounting space therein, safety of the optical fiber cable, simplification of the wiring, and both attachment and detachment of the fiber cable can be realized and at the same time, the appearance of the equipment can also be improved by minimizing the protrusion of the cable in front of the surface plate.

It is to be understood that the invention is by no means limited to the specific embodiments illustrated and described herein, and that various modifications thereof may be made which come within the scope of the present invention as defined in the appended claims.

We claim:

1. An optical fiber cable lead-in structure for a shelf having a space for receiving a remaining portion of the optical fiber cable, and an electronic circuit unit mounted thereon having a board and a surface plate; such surface plate is provided perpendicular to the board and at one side of the board; such surface plate covering the front side of the shelf when mounting, comprising:
    an optical connection for connection between the optical fiber cable and the electronic circuit unit, which is provided on the board adjacent to the backside of the surface plate;
    an outwardly protruding portion that is provided in the surface plate so as to correspond to the optical connection, such that attaching and detaching operation of the optical connection may be easily effected; and
    an opening that is provided in the surface plate such that the optical fiber cable extending from the remaining fiber cable receiving space is wired so as to extend along the surface plate until the cable passes through the opening of the surface plate while describing a slight arch, and in turn to extend along the backside of the surface plate while describing another slight arch until the cable reaches the optical connection on the board of the electronic circuit unit.

2. An optical fiber cable lead-in structure according to claim 1, wherein said optical connection comprises an optical adapter provided on the electronic circuit unit and an optical connector provided on the end of the optical fiber cable; both being arranged parallel with and adjacent to the backside of the surface plate.

3. An optical fiber cable lead-in structure according to claim 1, wherein said optical fiber cable is releasably secured to the electronic circuit unit at least one point by a securing means.

4. An optical fiber cable lead-in structure according to claim 1, and further comprising a cover for an electromagnetic shield, that is detachably placed on the front side of the shelf mounted with a plurality of the electronic circuit units.

* * * * *